Figure 1:
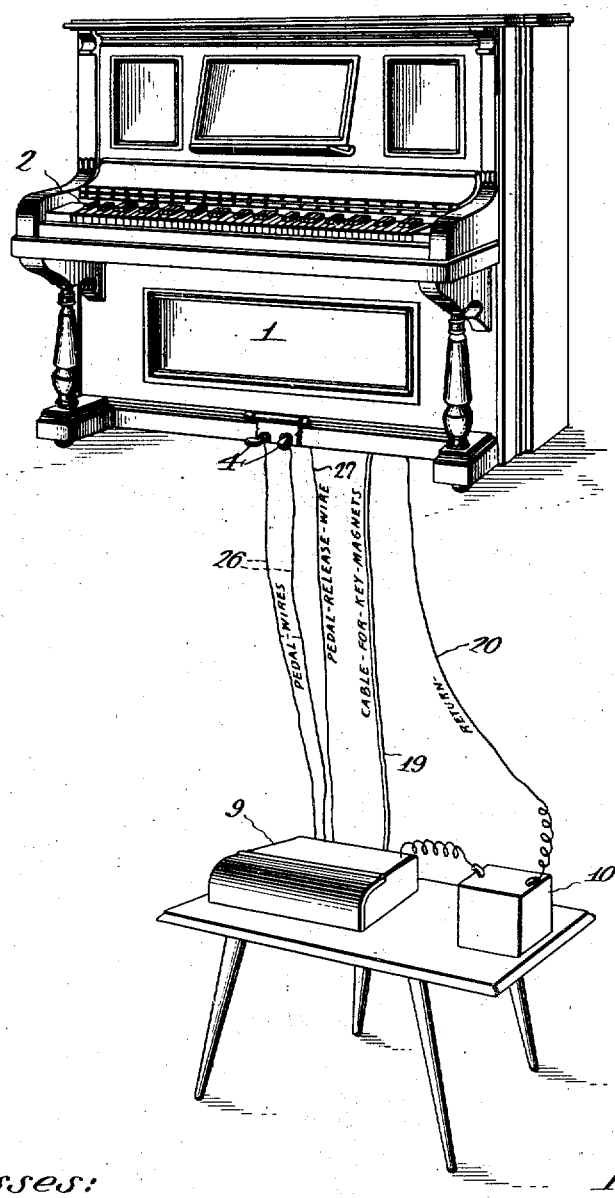

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911.

13,244.

10 SHEETS—SHEET 1.

Witnesses:
S. E. Brown
D. F. Nehoe

Inventors:
Timothy B. Powers and Mayo R. Jewell
by their Atty's:
Philip Sanger Rice & Conway

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911.

13,244.

10 SHEETS—SHEET 2.

Witnesses:
S. E. Brown
P. F. Kehoe

Inventors:
Timothy B. Powers and Mazyr R. Jewell
by their Attys:
Philipp Sanger Rice & Kennedy

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911.

13,244.

10 SHEETS—SHEET 3.

Witnesses:
S. E. Brown
T. H. Kehoe

Inventors:
Timothy B. Powers and Mayo R. Jewell
by their Attys:
Philipp Sanger Rice Kennedy

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911.

13,244.

10 SHEETS—SHEET 4.

*Witnesses:*
J. E. Brown
N. F. Nehoe

*Inventors:*
Timothy B. Powers and Mayo R. Jewell
by their Attys:
Philipp Sawyer Rice & Kennedy

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911.

13,244.

10 SHEETS—SHEET 5.

Witnesses:
S. E. Brown
P. A. Kehoe

Inventors:
Timothy B. Powers and Mayo R. Jewell
By their Attys:
Phelps Sanger Rice & Kenney T. B. POWERS & M. R. JEWELL.
AUTOMATIC PLAYING APPARATUS FOR MUSICAL INSTRUMENTS.
APPLICATION FILED MAR. 1, 1906.
Reissued May 23, 1911.
13,244.
10 SHEETS—SHEET 6.
Fig. 9.
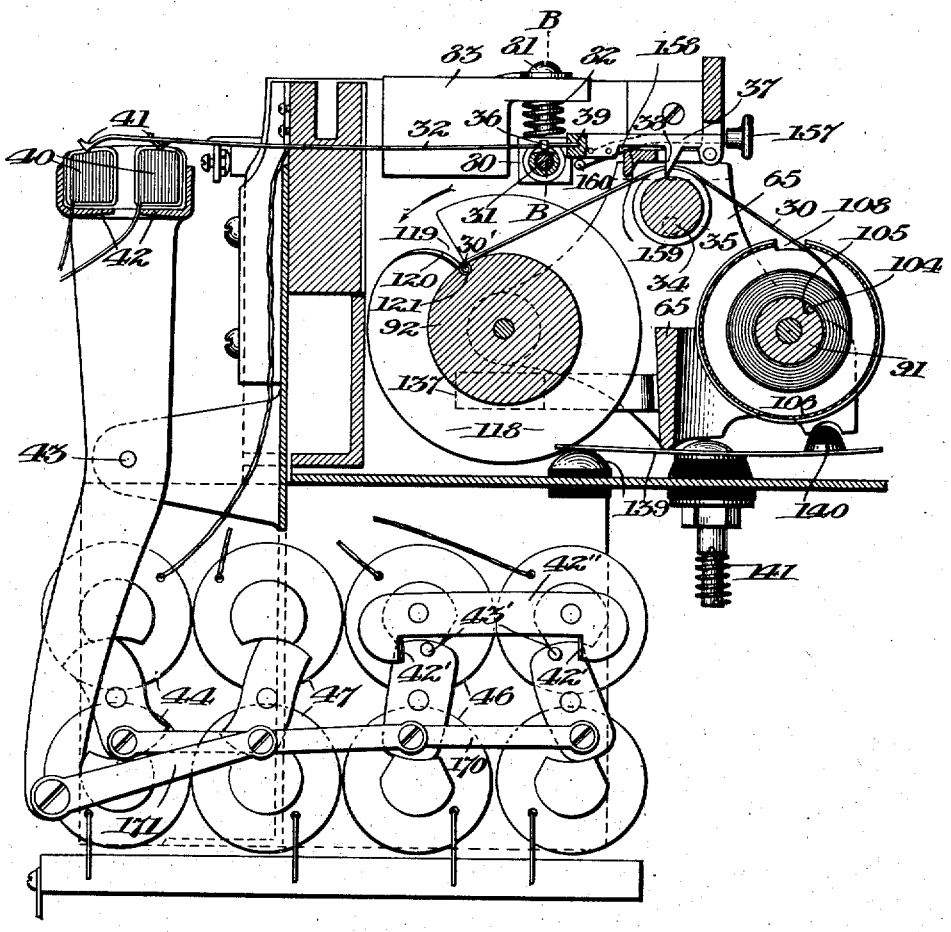
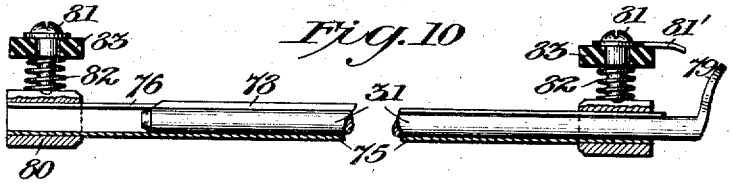
Witnesses:
S. E. Brown
D. F. Kehoe
Inventors:
Timothy B. Powers and Major R. Jewell
by their Attys:
Philipp Zeiger Rice & Kennedy

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911. 13,244.

10 SHEETS—SHEET 7.

Witnesses:
S. E. Brown
P. A. Nehoe

Inventors:
Timothy B. Powers and Major R. Jewell
By their Attys:
Philipp Sanger Rice & Kenney

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911.

13,244.

10 SHEETS—SHEET 8.

Witnesses:
A. E. Brown
D. F. Kehoe

Inventors:
Timothy B. Powers and Major R. Jewell
by their Attys:
Philipp Sawyer Rice & Kennedy

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911.

13,244.

10 SHEETS—SHEET 9.

Witnesses:
A. E. Brown
P. H. Kehoe

Inventors:
Timothy B. Powers and Meyer R. Jewell
by their Attys:
Philipp Sanger Rice & Hanner

T. B. POWERS & M. R. JEWELL.

AUTOMATIC PLAYING APPARATUS FOR MUSICAL INSTRUMENTS.

APPLICATION FILED MAR. 1, 1906.

Reissued May 23, 1911.

13,244.

10 SHEETS—SHEET 10.

Witnesses:
S. E. Brown
P. F. Kehoe

Inventors:
Timothy B. Powers and Magnus R. Jewell
by their Attys:
Philipp Sanger Rice & Kennedy

UNITED STATES PATENT OFFICE.

TIMOTHY BERNARD POWERS, OF NEW YORK, N. Y., AND MAJOR ROMEYN JEWELL, OF CHICAGO, ILLINOIS, ASSIGNORS, BY MESNE ASSIGNMENTS, TO THE TELELECTRIC COMPANY, OF PITTSFIELD, MASSACHUSETTS, A CORPORATION OF MASSACHUSETTS.

AUTOMATIC PLAYING APPARATUS FOR MUSICAL INSTRUMENTS.

13,244. Specification of Reissued Letters Patent. Reissued May 23, 1911.

Original No. 753,809, dated March 1, 1904, Serial No. 72,012. Application for reissue filed March 1, 1906. Serial No. 303,732.

*To all whom it may concern:*

Be it known that we, TIMOTHY BERNARD POWERS, of New York city, county of New York, and State of New York, and MAJOR ROMEYN JEWELL, now of Chicago, county of Cook, and State of Illinois, and formerly of New York, city, county of New York, and State of New York; have invented new and useful Improvements in Automatic Playing Apparatus for Musical Instruments, of which the following, taken in connection with the accompanying drawings, is a full, clear, and exact description.

This invention relates to improvements in automatic playing apparatus for musical instruments, being applicable for use in connection with various forms of string or reed instruments and referring more particularly to electrically-operated pianos, organs, and similar key board musical instruments.

The primary object of this invention is to provide means for automatically reproducing any musical composition with all the variations and combinations of tone, expression, and feeling to give a faithful interpretation of the composer's purposes and intentions.

Another object is to so construct and arrange certain parts of the apparatus as to permit the operator to manually control the operation of various elements to vary the volume and expression of the music at will and to entirely cut out the expression controlling magnets and fingers, if desired.

A further object is to control the wind and rewind of the music sheet, both manually and automatically, and to also provide means for automatically and manually releasing the music sheet carriage from its operative position for permitting the removal and insertion of the music sheet cylinders.

To this end the invention consists in the combination, arrangement, and construction of the parts of a music playing apparatus, as hereinafter fully described, and pointed out in the claims.

Figure 2:
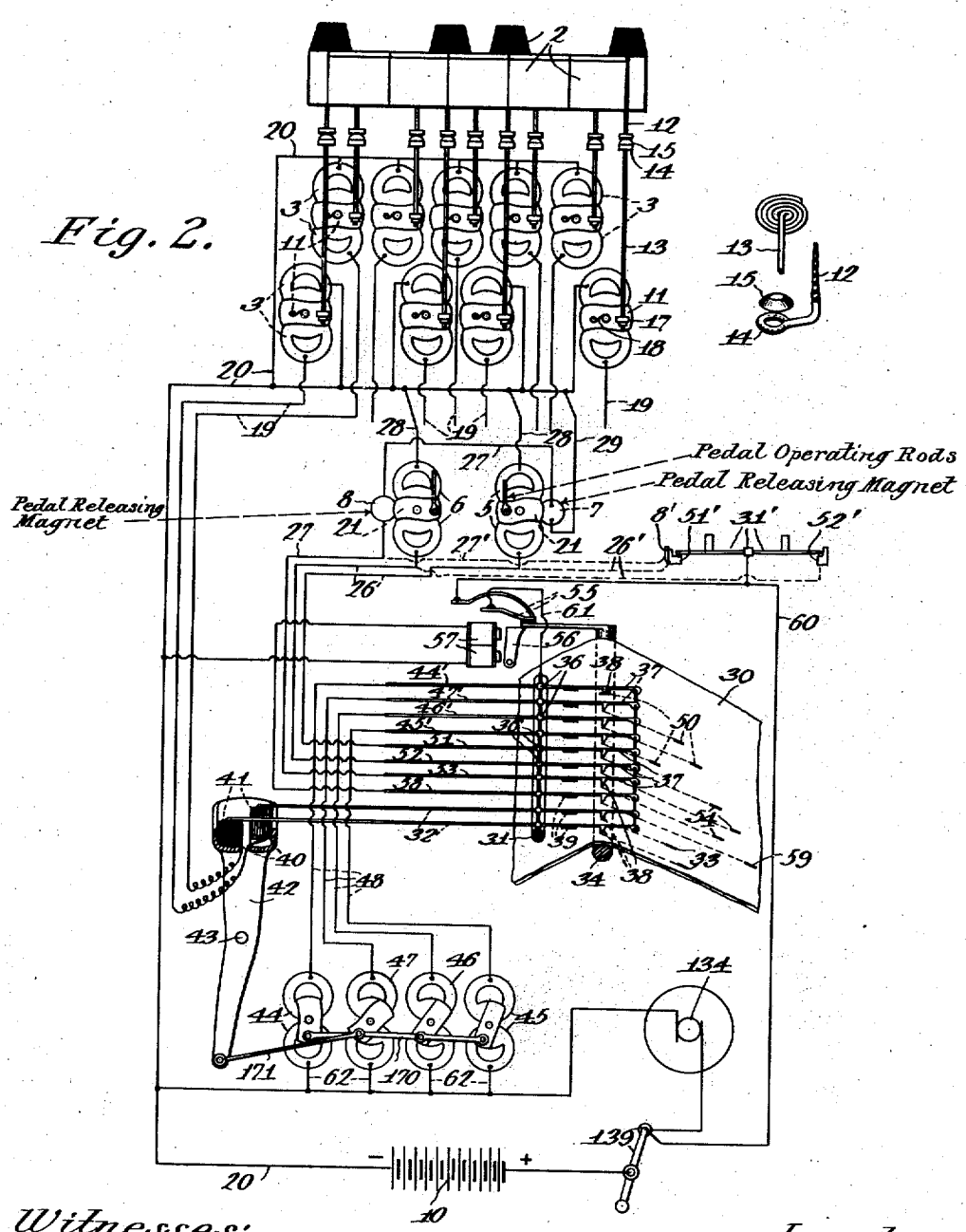
Figure 3:
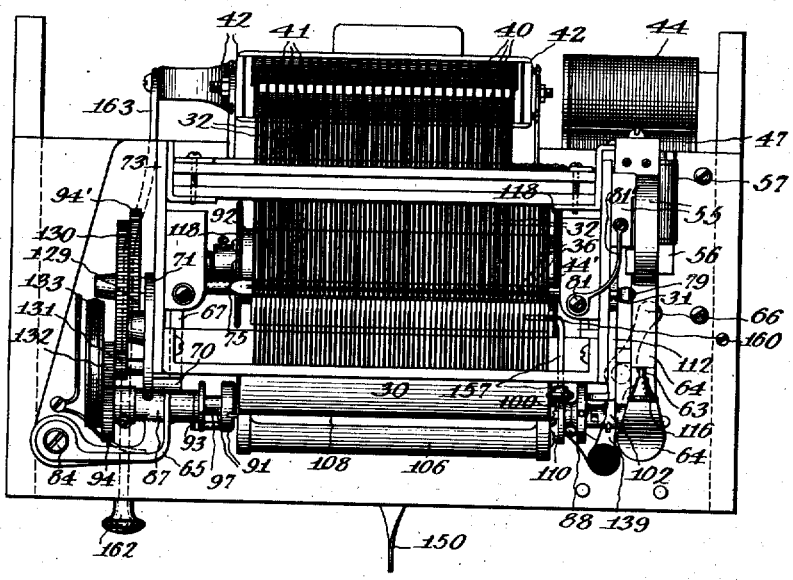
Figure 4:
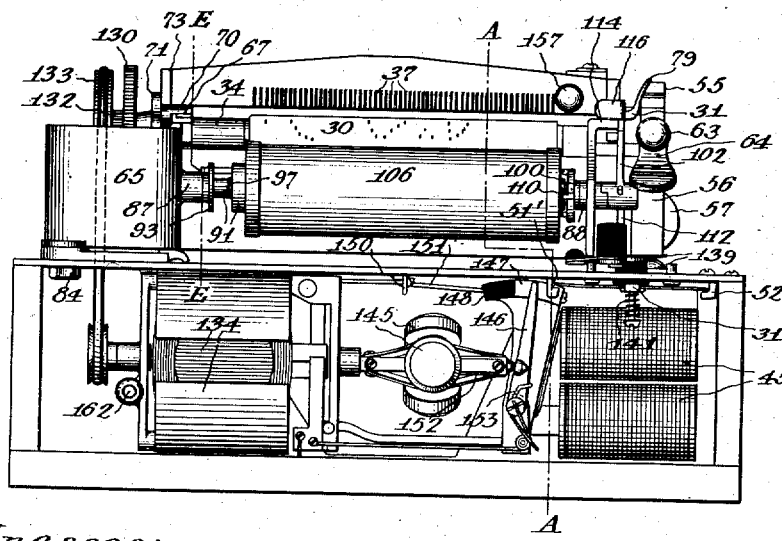
Figure 5:
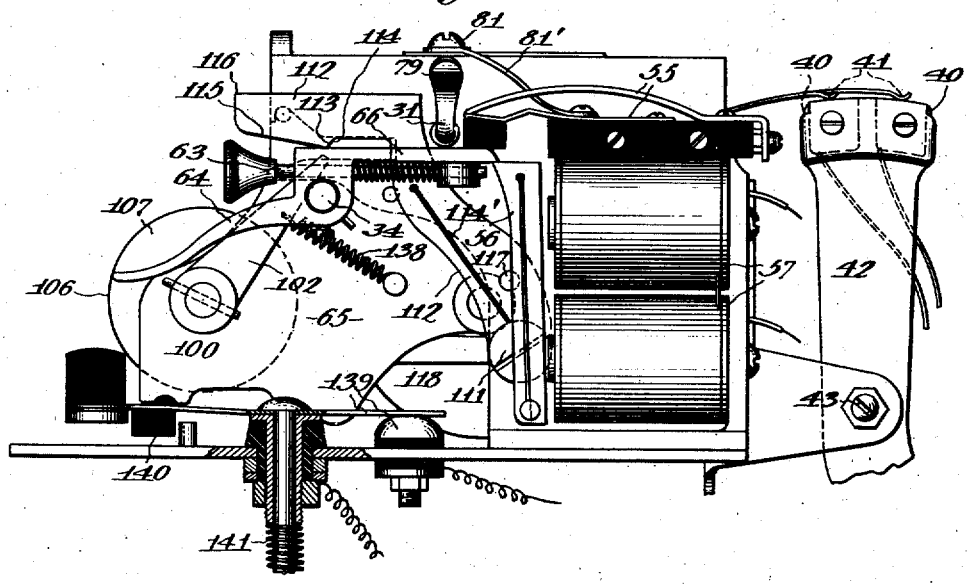
Figure 6:
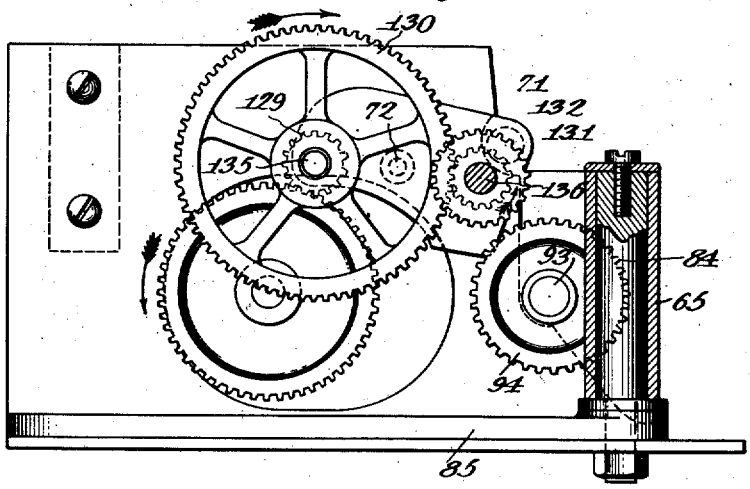
Figure 7:
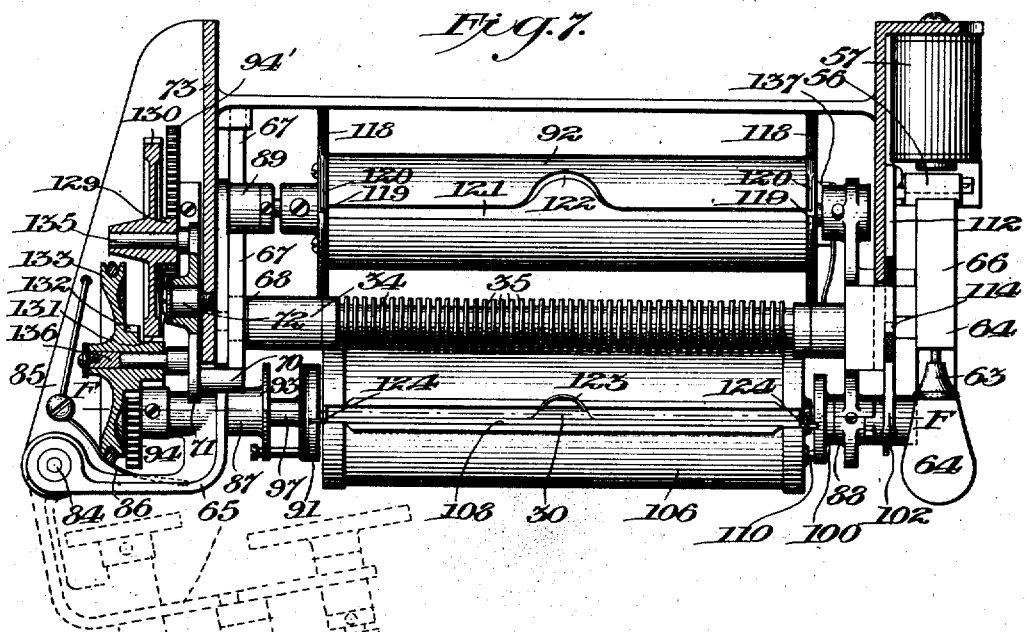
Figure 8:
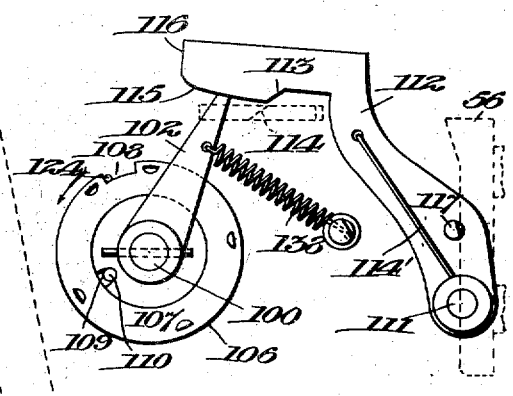
Figure 11:
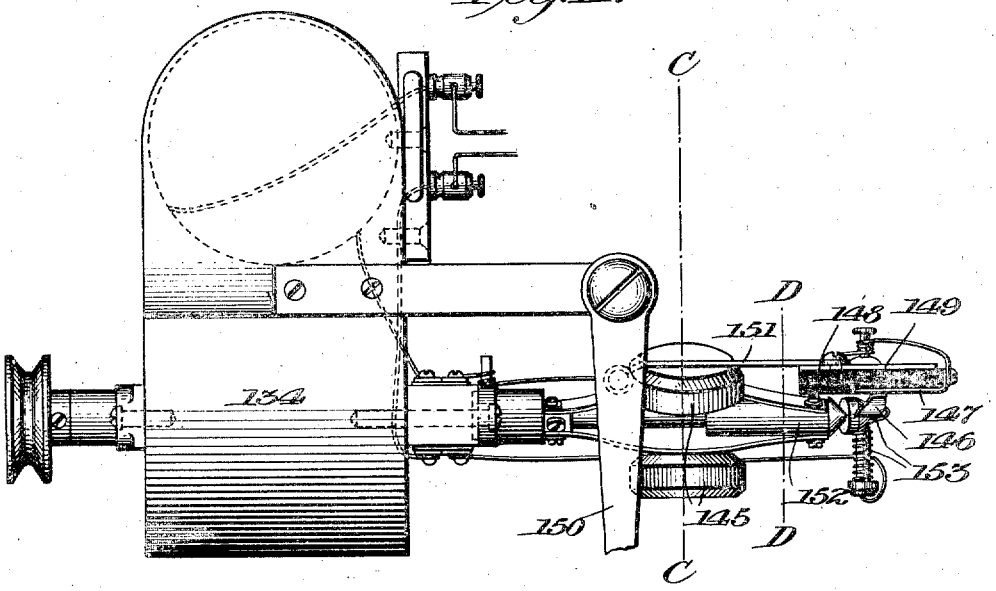
Figure 12:
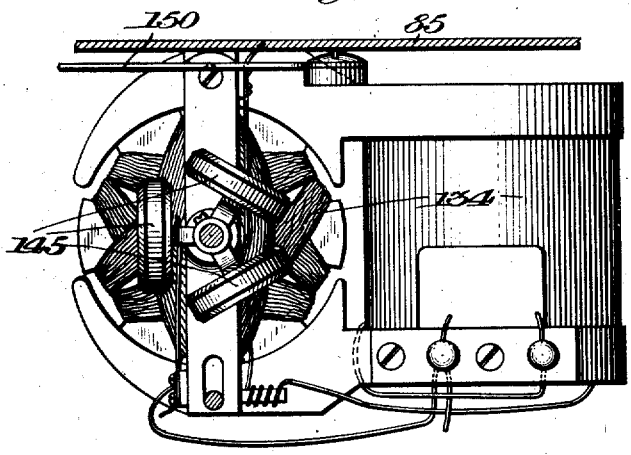
Figure 13:
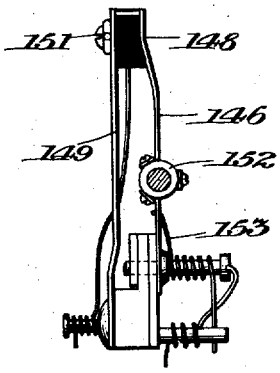
Figure 14:
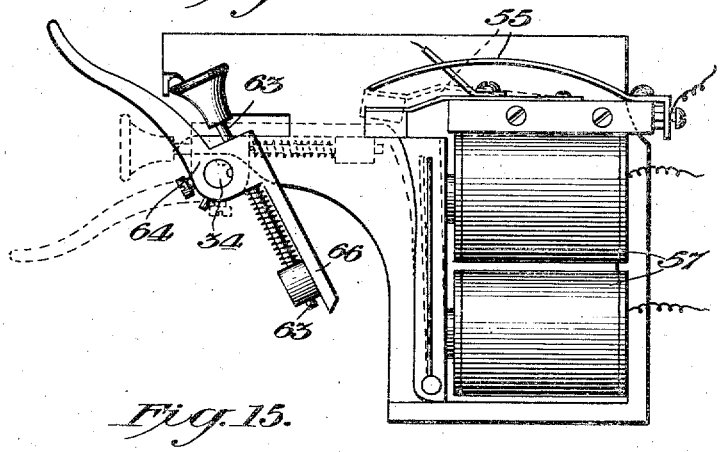
Figure 15:
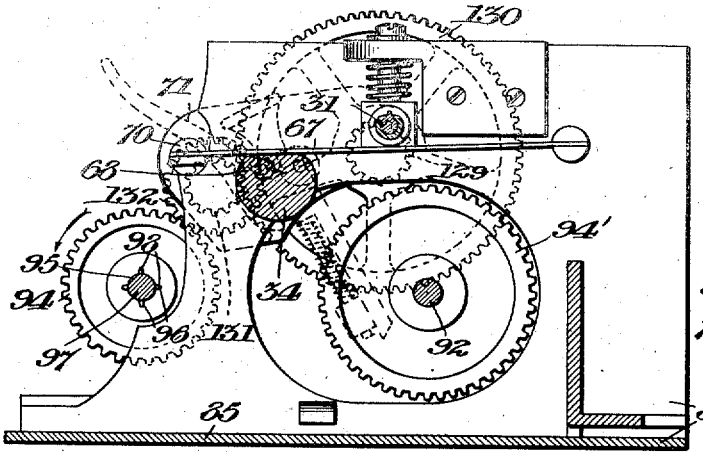
Figure 17:
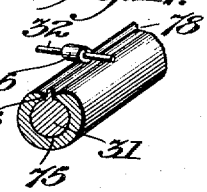
Figure 16:
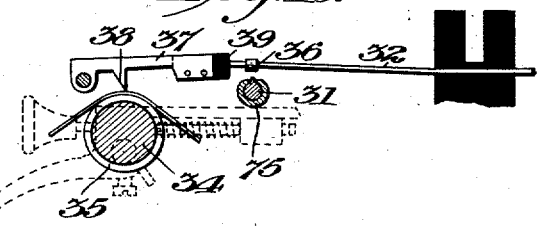
Figure 18:
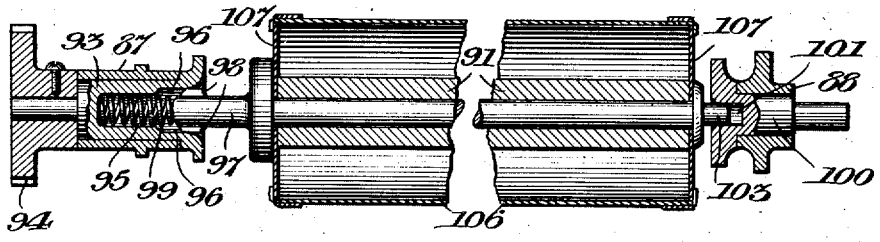
Figure 19:
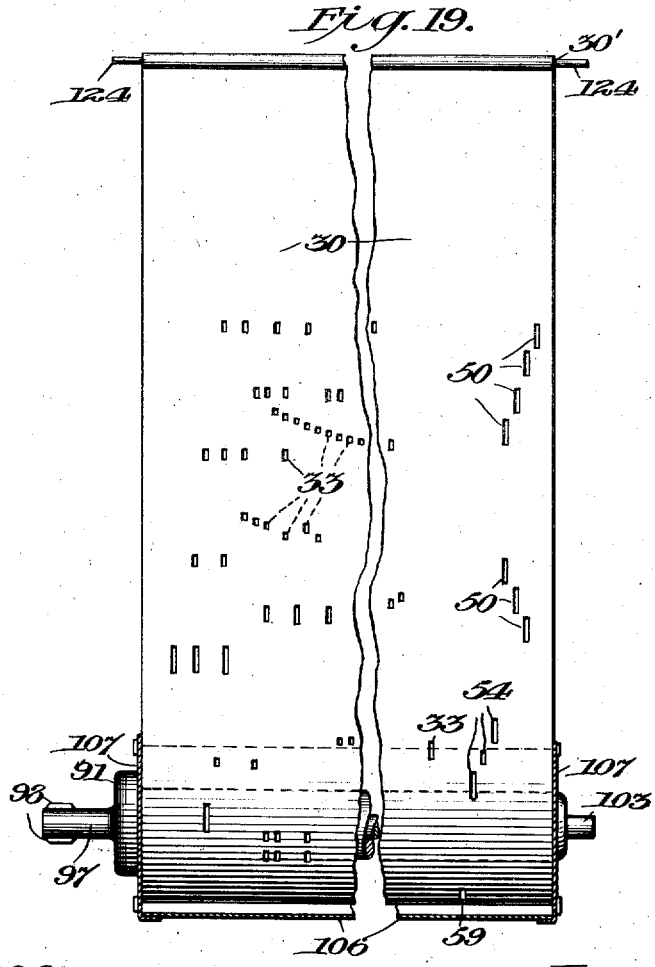
Figure 20:
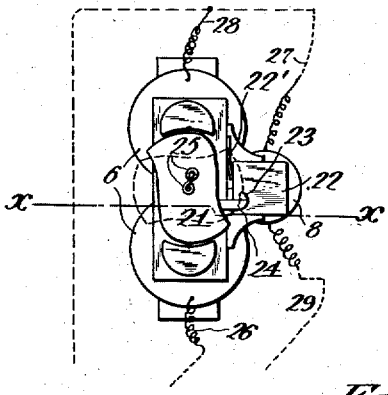
Figure 21:
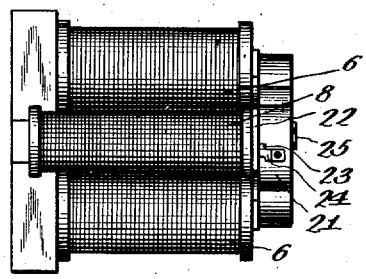
Figure 22:
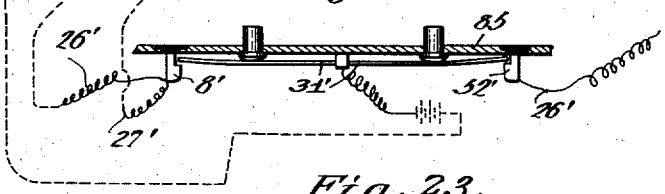
Figure 23:
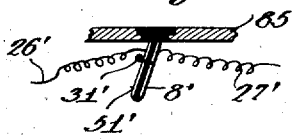
Figure 24:
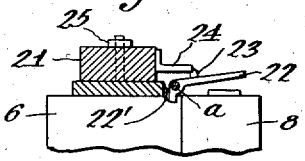

Referring to the drawings, Figure 1 is a perspective view of a piano and our improved playing device connected thereto. Fig. 2 is a diagrammatic view showing one form of connecting the several electric circuits from a single source of electric energy to the key and pedal magnets, motor and circuit breaker, and expression controlling magnets. Figs. 3 and 4 are respectively top plan and front elevation of the detached playing apparatus. Figs. 5 and 6 are enlarged opposite end views, partly in section, of the upper portion of the device seen in Figs. 3 and 4. Fig. 7 is a plan view of the swinging carriage and mechanism mounted thereon, showing also the adjacent portion of the supporting frame and driving mechanism in section and the electrically operated means for controlling the position of the driving mechanism, the swinging frame and the parts mounted thereon being shown in dotted lines in its inoperative position. Fig. 8 is a detail end view of the music sheet cylinder and the carriage holding and releasing mechanism. Figs. 9 and 10 are sectional views taken, respectively, on line A A, Fig. 4, and B B, Fig. 9. Fig. 11 is a top plan view of the motor, showing the automatic and manually operated controller therefor. Figs. 12 and 13 are sectional views taken, respectively, on lines C C and D D, Fig. 11. Fig. 14 is a detail view of the electrically operated circuit breaker and the rocking lever for controlling the position of the driving mechanism and bridge for the music sheet. Fig. 15 is a sectional view taken on line E E, Fig. 4. Fig. 16 is a detail sectional view of the eccentric bridge for the music sheet, the contact bar and one of the contact fingers controlled by the music sheet. Fig. 17 is an enlarged fragmentary view of a portion of the contact bar and the contact sleeve of one of the fingers. Fig. 18 is a sectional view, partly broken away, taken on line F F, Fig. 7. Fig. 19 is a plan view of the music-sheet, showing the rewinding roller and its inclosing case. Figs. 20 and 21 are respectively an end view and side elevation of one of the pedal controlling magnets. Figs. 22 and 23 are detail views of the manual means for controlling the operation of the pedal magnets. Fig. 24 is a sectional view taken on line *x x*, Fig. 20.

Similar reference characters indicate corresponding parts in all the views.

In the drawings, 1 represents a piano, having a key-board 2, a series of key operating magnets 3, pedals 4, and pedal controlling magnets 5, 6, 7 and 8.

9, Fig. 1, represents a suitable inclosing case containing the various devices for controlling the operation of the key and pedal controlling magnets, and 10 represents a battery or other source of electric energy for operating various parts of our invention.

The key operating magnets 3 may be of any desired construction adapted to operate the keys independently of each other, being here illustrated as each consisting of double magnets having projecting pole pieces and oscillatory armatures 11 pivoted between the pole pieces and adapted to be rocked into alinement therewith when the magnets are energized. We preferably provide one of these magnets for each key of the musical instrument, the armature of each of which is connected to the key by suitable rods 12 and 13, the rod 12 being secured to the lower face of the key by screw threads or other equivalent fastening means and provided with a substantially horizontal loop 14 and a buffer 15, having an aperture alined with the opening in the loop. The lower section 13 is preferably formed of wire passed through the loop and aperture of the buffer and having its upper end arranged in the form of a coil engaged with the buffer and its lower end connected to the armature 11 by a suitable swivel connection 17 at one side of the axis of the armature. As the magnet is energized the armature is rocked to operate the key of the instrument, said armature being returned to its normal position either by the key or by a suitable spring 18.

The upper section 12 of the connection between the key and its magnet being free to move upon the lower section, it is evident that said key may be operated manually in the usual manner without affecting the operation of the armature. These several magnets are connected to the battery 10 by suitable feed wires 19 and return wires 20, the current being controlled by a suitable perforated music sheet and independent contact making and breaking devices hereinafter described.

The pedal controlling magnets are substantially identical in construction, there being one set of magnets for each pedal, in this instance two, as seen in Figs. 2, 20 and 21. These pedal magnets 5 and 6 are similar to the key controlling magnets 3, being each provided with projecting pole pieces, and a rocking armature 21, adapted to be drawn into alinement with the pole pieces when the magnet is energized, the armature of each of the magnets being connected to its corresponding pedal in any desired manner not necessary to herein illustrate or describe for effecting the operation of its corresponding pedal for the purpose for which said pedal is intended, one of the pedals being usually for a soft expression and the other for a louder expression, the use of these pedals being well known to those skilled in the art.

It is sometimes desirable to hold either one or the other of these pedals for a limited time in its operative position, and we have therefore provided each of the pedal controlling devices with an additional magnet 7 and 8, having an independent armature 22, which is pivoted at 22[a] and provided with a shoulder 23, arranged to engage a shoulder 24 on the armature 21, and which is normally held away from its core by a spring 22′, the shoulder 23 being beveled on one side, so arranged relative to the shoulder 24 that when the armature 21 is drawn to its operative position by energizing the magnet, as 5, the shoulder 24 rides upon the beveled face of the shoulder 23, thus depressing its armature against the action of the spring 22′, which as soon as the shoulder 24 passes the shoulder 23 reacts upon the armature 22 and automatically interlocks the shoulder 23 with the shoulder 24, this latter shoulder 23, serving to hold the armature 21 and the pedal connected thereto in their operative positions until the magnets 7 8 are energized. This energizing of the magnets 7 8 operates the armature 22 and draws the shoulder 23 out of the path of the shoulder 24, thereby permitting the return of the armature 21 to its normal position, this return movement of the armature 21 being effected or facilitated by a suitable spring 25.

The magnets 7 and 8 are usually connected to the battery 10, being each connected in a circuit independent of the circuit for the adjacent pedal magnet. The energizing of these pedal magnets 5 and 6 and the auxiliary magnets 7 and 8 is controlled by suitable contact devices connected in their respective circuits, the contact being controlled by the music sheet previously described. Suitable feed wires 26 and 27 connect the magnets 5, 6, 7, and 8 with their respective contact terminals, said magnets being connected to the return conductor 20 by suitable wires 28 and 29. Thus far we have described the key and pedal operating magnets and the circuits connected thereto, and we will now proceed to describe the means which control the operation of these magnets or, in other words, the various mechanisms which are inclosed in the case 9.

The means for controlling the key operating magnets, Figs. 1, 5, 9, 10, and 19, consists of a music sheet 30, a contact bar 31, metal contact fingers 32, and suitable driving mechanism, hereinafter described, for moving the music sheet. This music sheet 30 is preferably formed of thin sheet metal, as brass, which is less susceptible to expansion and contraction than paper, and is more easily handled without liability of injury, and is provided with a series of perforations 33, co-acting with the contact fingers 32 for controlling the operation of the key magnets and keys connected thereto for producing music. The opposite ends of the music sheet are wound upon suitable rollers presently described, and the intermediate portion travels over an eccentrically pivoted rocking bridge 34, having a series of annular grooves 35, alined with the fingers 32, said fingers being formed of conducting material and being each provided with a rotatable contact sleeve 36, of noncorrosive material, adapted to contact with the bar 31, which is also formed of electric conducting material. The bridge 34 is also formed or provided at one end with a flattened or cam face 68, the purpose of which will be hereinafter described.

The ends of the fingers 32, Figs. 9 and 16, adjacent to the contact bar 31 are loosely connected to suitable rocking fingers 37, forming a continuation of the fingers 32 and having trailing points 38, adapted to enter the apertures 33 in the music sheet and to also enter the grooves 35 in the bridge 34, these grooves 35 being of sufficient depth to insure the contact of the sleeves 36 with the contact bar 31 when the trailing points 38 are registered with the apertures 33. The fingers 32 and 37 are preferably insulated from each other, the adjacent ends of the fingers 37 being provided with plates 39, of insulating material, said plates being formed with sockets in their end faces for receiving the adjacent ends of the fingers 32. The fingers 32 preferably consist of spring wire tensioned toward the contact bar 31, and the fingers 37 are so connected to the fingers 32 that when the trailing points 38 register with the apertures in the music sheet and the corresponding grooves in the bridge 34 the sleeves 36 automatically contact with the contact bar, thereby closing the key operating circuits through the contact bar and fingers 32, said contact bar and fingers 32 being connected in the key operating circuit in the manner hereinafter described.

In order to automatically reproduce the musical composition to give the precise expression and feeling intended by the composer, we provide a plurality of rheostats, Figs. 2, 3, and 9, connected in the circuits between the contact fingers 32 and the key operating magnets 3 and consisting of suitable resistance coils 40 and contact terminals 41, the terminals 41 preferably forming a part of the contact fingers 32 and normally contacting by their own spring tension with the helices of the coils 40. The coils 40 are preferably mounted upon a rocking frame 42, which is pivoted at 43 and is actuated by suitable electric means, presently described for varying the position of the coils relative to the contact terminals 41. We usually provide one of these coils for each of the key-operating magnets, the coil for each magnet being connected to its respective feed wire 19 in such manner that when the coil is moved in one direction the resistance through the feed wire 19 is increased and when moved in the other direction the resistance is diminished.

The electric means, Figs. 2, 4, and 9, for shifting the position of the resistance coils relative to the contact terminals 41 is so constructed and arranged as to move the frame 42 for varying the resistance from one extreme to the other or to vary the contact to any number of points intermediate the extremes for gradually varying the resistance or for immediately producing any degree of resistance which may be desired. This variation in the resistance may be effected by one or more magnets coöperating with one or more electric conducting fingers adapted to contact with the bar 31 and controlled by perforations provided in the music sheet. For the purpose of clearly illustrating the operation of this resistance controlling device we have shown a series of magnets 44, 45, 46, and 47, each of which magnets operates to shift the frame 42 to a certain predetermined position, thereby moving the coils 40 to certain predetermined positions with relation to the fingers 32 and contact terminals 41. These resistance controlling magnets are each connected in an independent circuit to suitable conducting fingers 44′, 45′, 46′, and 47′, Fig. 2, which are similar to the fingers 32, being provided with contact sleeves 36 and extensions 37, the fingers 44′, 45′, 46′, and 47′ being connected by suitable conductors 48 to their respective magnets and forming the feed wires to said magnets from the main conductor 31, the only difference between these latter fingers and the fingers 32 being that they are not provided with any contact terminals and have no connection with the resistance coils.

In Fig. 2 we have shown each of the magnets 44, 45, 46, and 47 as connected to the return wire 20 by return conductors 62 and as provided with suitable pole pieces and oscillatory armatures movable between the respective pole pieces, said armatures being similar in construction to those described for operating the keys and pedals and being limited in their rocking movement by shoulders 42′, provided on a yoke 42″ and arranged to engage projections 43′ upon the armatures of the magnets 45 and 46, as seen in Fig. 9.

The music sheet 30, Figs. 2 and 19, is provided with apertures 50 for controlling the contact of the fingers 44′, 45′, 46′ and 47′ with the bar 31, one of the trailing points 38 of one of the fingers 44′, etc., being shown in Fig. 2 as registered with one of the apertures 50 and the armature of its corresponding magnet being shown as moved to its operative position for shifting the resistance coils 40 to the point of greatest resistance.

The armatures, Fig. 9, of the several expression magnets are connected to each other and to the rocking frame 42, as by a connecting rod 170 and link 171, as shown in Fig. 2, in such manner that when one of the armatures is rocked the positions of the remaining armatures are correspondingly shifted, so that no matter which armature may be moved they all maintain substantially the same relative position to each other; and the connections of the several armatures are such that when the magnet 44 is energized the resistance coils will be moved to the position of greatest resistance, when the magnet 45 is energized the coils will be shifted to slightly reduce the resistance, the magnet 46 when energized will operate to still further reduce the resistance, and when the magnet 47 is energized it will move the rocking frame 42 to cut out practically all the resistance and permit a current of full potential to be supplied to the key operating magnets.

The electrical contact devices, Fig. 2, for controlling the operation of the pedal magnets 5, 6, 7 and 8, preferably consist of fingers 51, 52, and 53, which are identical in construction with the fingers for the expression controlling magnets, being preferably provided with non-corrosive contact sleeves 36, adapted to contact with the bar 31, and having the extensions 37 and controlling points 38, these controlling points being adapted to enter apertures 54 in the music-sheet, whereby the circuit is closed at the proper time through the contact bar 31, fingers 51, 52 and 53, and pedal operating magnets 5, 6, 7 and 8.

It is apparent from the foregoing description that when one of the perforations 54 is registered with one of the trailing points—as, for instance, that of the finger 51—the contact sleeve 36 of said finger automatically contacts with the bar 31, thereby closing the circuit through the magnet 5 to energize the magnet and operate its armature 21, which in turn operates the pedal connected thereto. At the same time the shoulder 24 on said armature automatically engages the shoulder 23 of the armature 22 of the magnet 7, which holds the armature 21 in operative position until another one of the apertures 54 registers with the trailing point of the finger 53 connected in the circuit of the electromagnet 7, whereupon the circuit through said magnet is closed and its armature is actuated to withdraw the shoulder 23 from engagement with the shoulder 24, whereby the armature 21 and the pedal to which it is connected are released and the armature then automatically returns to its normal position either by means of the pedal connected thereto or the spring 25. In like manner the magnets 6 and 8 control the operation of the other pedal connected thereto, it being understood that any number of pedals may be used and similarly connected in an independent circuit adapted to be closed by a suitable perforation in the music-sheet.

It is desirable in this class of playing apparatus to provide means for automatically breaking the circuit through the several key and pedal operating magnets and also through the expression controlling magnets when the music sheet approaches the end of the musical composition, and we therefore provide, Figs. 2, 5 and 14, a suitable circuit breaker 55, which is connected in the key, pedal, and expression controlling circuits between the contact bar 31 and the source of electric energy 10. This circuit breaker preferably consists of suitable terminals, which are normally in contact with each other during the operation of the apparatus for producing music, one of the terminals being usually spring tensioned to separate from the other terminal automatically and held in contact with said other terminal by the arm 66 of a bridge operating lever 64 which is held in the position shown in Fig. 5 by a suitable catch 56, in this instance consisting of an armature of an electromagnet 57, the armature being so arranged that when the magnet is energized the armature is moved to release the lever 64 and the spring contact terminal of the circuit breaker 55, whereupon said movable contact terminal automatically separates from the other terminal and breaks the circuit through the key, pedal, and expression controlling magnets. The means for energizing this magnet 57 consists of a contact finger 58, Fig. 2, which is substantially identical in construction with the finger 44', being preferably provided with a non-corrosive contact sleeve 36 and an extension 37 having a trailing point 38, said trailing point being adapted to register with a suitable aperture 59 in the music sheet, this aperture being usually at the end of the composition and the last to register with any of the trailing points, and when said aperture is registered with its trailing point 38 the circuit is closed through the magnet 57 and operates the armature 56 for the purpose above described, it being understood that one of the terminals of the circuit breaking device 55 is connected to one pole of the battery 10 by a suitable feed wire 60, the other terminal being connected to the contact bar 31 by a conductor 61.

It is sometimes desirable to break the circuit through the several key, pedal, and expression controlling magnets during the rendering of the musical composition by the music sheet, and we therefore provide manually operated means consisting of a push rod 63, Figs. 4, 5 and 14, which is movably mounted upon the bridge operating member 64 and adapted to engage the armature 56 for operating the same to effect the release of the movable terminal of the circuit breaker 55. This armature 56 also serves to control the position of the winding and rewinding mechanism for the music sheet, previously mentioned, through the medium of the bridge 34, which is eccentrically pivoted at its opposite ends in a swing frame 65, hereinafter described.

Secured to one end of the bridge 34, Figs. 5 and 7, is the operating member 64, consisting of a lever having an arm 66, normally engaged with the armature 56 in such manner that when the armature is drawn toward the magnet 57 the bridge 34 is free to rock upon its eccentric pivots, the rocking movement being facilitated by a spring 67, (see Figs. 7 and 15) which is secured at one end to the end wall 73 of the frame 85 and has its other end tensioned against the cam face 68 formed on the bridge, said spring being extended beyond the bridge and engaged with a stud 70, provided on a rock arm 71, which in turn is centrally pivoted at 72 to the end wall 73, of the supporting frame 85. The purpose of eccentrically pivoting the bridge 34 is to provide means whereby when the music sheet is placed in position upon its feeding rolls, the bridge by being manually rocked by the lever 64 may be elevated to raise the music sheet into position to coact with the fingers 37 and to tension the music sheet and spring contact fingers during the operation of the apparatus for producing music, it being understood that the bridge is in its highest position during such operation and is held in this position by the engagement of the arm 66 with the armature 56.

The contact bar 31, Figs. 9 and 10, is movable transversely of the several contact fingers and music sheet, being adapted to be withdrawn entirely, if desired, for the purpose of scouring or polishing its contact surface and insuring a positive electrical contact with the contact part of fingers of the several key, pedal, and expression controlling circuits. This contact bar is preferably mounted in a suitable metal guide or sleeve 75 of conducting material, connected in the key operating circuit, having a lengthwise opening 76, through which the contact rib or surface 78 of the contact bar 31 projects, the inner end of the contact bar being slightly tapered and its outer end being provided with a hand piece 79, whereby the contact bar 31 may be readily withdrawn or inserted into the guide sleeve 75, the inner tapering end of said contact bar serving to elevate any of the contact fingers during the insertion of the bar 31 without liability of injuring or binding the fingers. The sleeve 75 is in electrical contact with the bar 31 and is preferably mounted at its opposite ends in suitable bearings 80, Fig. 10, which are electrically connected to the sleeve and are adjustable vertically by means of suitable adjusting screws 81 and springs 82, the adjusting screws 81 being in electrical connection with the bar 31 through the bearings 80 and sleeve 75 and being mounted in insulating supports 83, one of the screws 81 being electrically connected by a wire 81′ to the circuit breaker 55. This sliding contact bar is an important feature of our invention, having a sliding electrical contact with the sleeve 75, and it is evident that by moving the same back and forth under the several contact points or sleeves 36 the contact surfaces are thereby cleaned and brightened, thus insuring a more perfect electrical contact with said sleeves and fingers.

The swing frame or carrier 65, Fig. 7, is adapted to support the music sheet and its supporting rollers and bridge, and is preferably arranged to swing outwardly in a substantially horizontal plane, being pivoted at 84 to a suitable supporting base 85 and adapted to be forced outwardly to its inoperative position by a spring 86. The opposite end walls of the frame 65 are provided with front bearings 87 and 88 and rear bearings 89 and 90, these bearings being arranged in a plane beneath and at the front and rear sides of the bridge 34. The front bearings 87 and 88 are adapted to support a revolving roller 91 to which the music sheet is secured, the rear bearings 89 and 90 being adapted to support a revolving feed roller 92. Journaled in the bearings 87 is a hollow bushing 93, having one end provided with a gear 94 and its inner end formed with a socket 95 and lengthwise grooves 96, the adjacent end of the roller 91 being provided with a trunnion 97, having ribs or shoulders 98, adapted to interlock with the grooves 96, said grooves being of sufficient length to permit the roller to be moved endwise against the action of a suitable spring 99, which is interposed between the end face of the trunnion 97 and the end wall of the socket 95. Journaled in the opposite end bearing 88 is a bushing 100, formed with a socket 101 in its inner face, its other end being provided with an arm 102 for a purpose hereinafter described, the socket 101 being arranged to receive a trunnion 103, formed on the adjacent end of the roller 91, said trunnion being free to revolve in the socket independently of the bushing 100. This roller 91, Figs. 8 and 9, is adapted to receive and support the music sheet, which is wound thereon and secured thereto at one end by a suitable rod 104, extending lengthwise of the roller within a suitable recess 105, or in any other suitable manner. Loosely mounted upon the roller 91 is a cylindrical casing 106, having end walls 107 and having a lengthwise opening or slot 108 extending through the cylindrical shell for permitting the withdrawal or movement of the free end of the music sheet therethrough, and having corresponding notches in the end walls 107. The bushing 100 and casing 106 are detachably locked to each other, the bushing 100 being provided with an annular flange having a recess or cut out 109, and the adjacent end wall of the casing 106 being provided with a projecting stud or pin 110, Figs. 7 and 8, projecting into said recess for locking the cylindrical casing and bushing together. Sufficient space is left between the inner end of the hollow bushing 93 and the adjacent end of the casing or roller 91 to permit the casing and roller to be moved endwise against the action of the spring 99 for withdrawing the trunnion 103 from the socket 101, whereupon said casing may be moved outwardly and endwise for withdrawing the trunnion 97 from the socket 96, the purpose of this being to permit the music holding case or cylinder and roller to be removed and a new music sheet and its holder inserted when desired.

Pivoted to the supporting frame 85 at 111 is a catch arm 112, Fig. 8, having a shoulder 113, adapted to interlock with a shoulder 114, provided on the carriage 65. This catch arm 112 serves to automatically engage and normally hold the swing frame in its opeartive or closed position, and is forced into operative position by a suitable spring 114′. The arm 112 is provided also with a cam face 115, adapted to be engaged by the arm 102 when actuated by the movement of the cylinder 106 upon the rewind of the music sheet, or the said arm 112 may be operated manually, being provided with a laterally extending finger piece 116. Secured to the arm 112 is a projecting stud 117, which is arranged to engage the armature 56 for simultaneously rocking the same when the catch arm 112 is elevated or moved to its inoperative position, thereby serving to operate the circuit breaker 55 mechanically to cut out the key, pedal, and expression controlling circuits when the carriage is released.

The roller 92, Figs. 7 and 9, is journaled in the bearings 89 and 90 and is provided with flanges 118, having suitable cut-outs 119 and spring catches 120, the intermediate portion of the roller being provided with a lengthwise groove 121, having an enlargement 122, the groove and recess being adapted to receive the free end of the music sheet and a suitable finger ring or loop 123 secured thereto. The free end of the music sheet is provided with a lengthwise bar 30′, Fig. 9, around which the music sheet is folded, said bar being extended beyond the opposite edges of the music sheet to form projections 124, adapted to engage the notches in the end walls 107 of the cylinder 106 when the music sheet is rewound upon the roller 91. The advance end of the music sheet 30 is adapted to rest in the recess or groove 121, the projecting ends 124 of the bar 30′ being adapted to enter the cut-outs 119, and to be held in position by the springs 120 in such manner that as the music sheet is unwound from the roller 92 the projections 124 will automatically withdraw from the recess 119 out of engagement with the spring catches 120.

The driving mechanism, Figs. 3, 4, 6, and 7, for rotating the rollers 92 and 91 in reverse directions preferably consists of gears 129 and 130, additional gears 131 and 132, and a pulley 133, actuated by a suitable motor 134, the gears 129 and 130 being mounted upon a spindle 135 on the rock arm 71 at one side of its pivot 72, and the gears 131 and 132 and the pulley 133 being mounted upon a spindle 136 on the arm 71 at the opposite side of its pivot, the gears 130 and 131 being in mesh with each other, and the gear 129 being adapted to mesh with a gear 94′ secured to the roller 92, when the arm 71 is rocked in one direction, and the gear 132 being adapted to mesh with the gear 94 on the roller 91 when the arm is rocked in the opposite direction, the operation of the rock arm 71 being controlled, as previously described, by the spring 67 and the operating member 64 for the bridge 34. A suitable brake 137, Fig. 7, engages the end face of the roller 92 and serves to prevent any slack in the music sheet during the process of rewinding the same or when the carriage is released. It is evident from the foregoing description that when the driving mechanism is connected to the roller 92 the music sheet will be wound thereon until automatically released by withdrawing the armature 56 from engagement with the arm 66, said armature being withdrawn either by the magnet or by means of the push rod 63, whereupon the driving mechanism is automatically shifted to actuate the roller 91 in the reverse direction for rewinding the music sheet thereon. When the music sheet is unwound from the roller 92 and the shoulders 124 engage the casing 106, said casing is partially rotated, thereby rocking the arm 102 and elevating the arm 112, which releases the carriage, and the carriage is then automatically swung outwardly by the spring 86 and disconnects the rollers 91 and 92 from the driving mechanism, as illustrated in Fig. 7, the arm 102 and casing connected thereto being returned to their normal position by a suitable spring 138.

The motor 134 is connected to the source of electric energy 10, the motor and other circuits previously described being provided with a suitable switch 139, which is adapted to be automatically opened by the carriage when the same is released, said switch being provided with a shoulder 140, adapted to interlock with the adjacent portion of the swing frame 65, and when said frame is swung outwardly the switch is released and forced to its inoperative or open position by a suitable spring 141, Figs. 5 and 9.

The shaft of the motor 134, Figs. 11, 12 and 13, is provided with a suitable governor or speed regulator consisting of centrifugally operated weights 145, a spring actuated contact arm 146, and a sliding contact plate 147 in electrical contact with the finger 146. This plate 147 is arranged upon an insulating bar 148, carried by an oscillatory bar 149, which is adapted to be moved manually along the contact finger 146 by a suitable hand lever 150 and a link 151 connecting said hand lever with the arm 149. It is thus evident that the speed of the motor may be regulated either automatically or by the hand piece 150. The contact finger 146 is arranged to oscillate along the plate 147, being forced into engagement with a sleeve 152 by a suitable spring 153, said sleeve 152 being actuated by a centrifugal movement of the weights 145. This contact plate 147 and the finger 146 are connected in the motor circuit in any suitable manner, and it is evident that when the finger 146 is moved out of contact with the plate 147, or vice versa, so that the finger is on contact with the insulating bar 148, the circuit will be cut out, thereby reducing the speed of the motor and permitting the contact finger 146 to return to contact with the plate 147.

It is sometimes desirable to cut out the expression-controlling magnets, and we therefore provide manually-operated means, Figs. 3, 4 and 9, consisting of a pull-rod 157, having a cam-face 158, adapted to ride upon a shoulder 159 of the supporting-frame of the apparatus, said pull-rod being provided with an arm 160, adapted to engage the fingers 44′, 45′, 46′, and 47′, which are in electrical connection with said magnets 44, 45, 46, 47 for elevating said fingers and preventing their automatic operation or control by the music-sheet. It is also desirable at times to manually operate the resistance-coils, and we therefore provide means consisting of a handpiece 162, Figs. 3 and 4, which is connected to the rocking frame 42 by a suitable link 163.

In order to enable the operator to control the operation of the pedals from a position remote from the instrument, we provide spring-conductors 31′ and terminals 51′, 52′, and 8′, the spring-conductors 31′ being connected to the source of electric energy, as the battery 10, by the wire 60, and the terminals 51′ and 52′ being connected, respectively, to the magnets 5 and 6 by wires 26′. (Shown by dotted lines in Fig. 2). The terminals 8′ and 51′ are secured to the opposite faces of a suitable insulating-piece (seen in Fig. 23) in such manner as to insulate them from each other, the terminals 8′ being connected to the release-pedal magnets 8 and 7 by wires 27 and 27′, Fig. 2, said wire 27′ being shown by dotted lines in said figure. These terminals 51′ and 8′ incline from a vertical position in such manner that the contact-face of the terminal 51′ lies in the path of the free end of the adjacent conductor 31′ as the same is depressed by its push-button, and by the continued depression of said conductor 31′ it normally tends to move in a vertical plane and has a sliding contact with said terminal and closes the circuit through one of the magnets, as 5, which is connected thereto by one of the wires 26′. This energizes the magnet 5 and rocks its armature 21 to operate the pedal connected thereto, said armature being automatically locked in this position by the shoulder 23 engaging the arm 24. If it is desired that the pedal remain in operative position, the pressure on the push-button is released, and the spring-conductor 31′ is permitted to return by its own tension to its normal position. In like manner the other pedal is operated by closing the circuit through the terminal 52′ and the adjacent spring-conductor 31′. If, however, it is desired to release either one of the pedals after the same has been forced to and held in its operative position, as just described, the downward movement of the terminal 31′ along the inclined face of the terminal 51′ is continued, which causes the said spring-conductor to spring laterally against its own tension, and as soon as said spring-conductor is sufficiently depressed by its push-button beneath the lower end of the terminal 51′, it instantly springs laterally and upwardly in the opposite direction under and against the similarly-inclined face of said terminal 8′, it being understood that the pressure on the push-button is released as soon as the spring-conductor leaves the lower end of the terminal 51′. As this spring conductor continues to move upwardly by its own tension in sliding contact with the terminal 8′ the circuit is closed through the release-magnets 7 and 8, which are then energized and operate their armatures to draw the shoulders 23 out of holding engagement with the arms 24, whereupon the armatures 21 are released and allowed to return to their normal positions.

In the operation of our invention the music-sheet holder or cylinder is placed in position upon the carriage and the end of the music-sheet is connected with the roller 92. The carriage is then swung to its operative position, and the lever 64 is rocked to move the bridge 34 to its operative position and connect the driving mechanism with the roller 92 and to raise the movable member of the circuit breaker 55 to close the magnet circuits at this point, and is then held against return movement by the armature 56. The switch 139 is then operated to close the circuit for the motor and also to close the connection to the contact-bar 31, the motor serving to operate the music-sheet mechanism for winding the music-sheet upon the roller 92. As the music-sheet reaches the end of the musical composition, the aperture 59 causes the circuit to close through the magnet 57, which attracts the armature 56, thereby releasing lever 64 and breaking the circuit at the circuit-breaker 55. On the release of the lever 64, the bridge 34 is returned to its inoperative position and the driving mechanism is disconnected from the roller 92, and the breaking of the circuit cuts out the key, pedal and expression controlling circuits, but does not affect the motor-circuit. The spring 67 then forces the driving mechanism into engagement with the gear 94 of the roller 91, which rewinds the music-sheet thereon until the shoulders 124 disengage from the roller 92 and engage with the notches in the end walls of the casing 106, which automatically rocks the casing and the arm 102 and thereby elevates the locking member out of the path of the shoulder 114 of the swinging carriage, whereupon said carriage is automatically forced outwardly by the spring 86, thus disconnecting the rollers from the driving mechanism and releasing the switch 139 which is then automatically operated to open the motor-circuit and stop the motor.

The operation of our invention will now be readily understood upon reference to the foregoing description and the accompanying drawings, and it will be noted that considerable change may be made in the detail construction and arrangement of the component parts of our improved playing apparatus without departing from the spirit of our invention.

Having thus fully described our invention, what we claim, and desire to secure by Letters Patent, is—

1. The combination with an electrically-operated key of a musical instrument, of a contact-finger and a non-rotating metal guide connected in the key-operating circuit, an electric conductor movable in said guide transversely of the finger in electrical contact with the guide, and means for making and breaking the contact between the finger and said conductor.

2. In an electrically-operated musical instrument, the combination of a series of contact-fingers, and a non-rotating metal sleeve, the fingers and sleeve being connected in the operating-circuit and a bar in electrical connection with the sleeve movable therein transversely of the fingers.

3. In an electrically-operated musical instrument, the combination of a series of contact-fingers, and a non-rotating sleeve, the fingers and sleeve being connected in the operating circuit and a conductor movable transversely of the fingers in contact with the sleeve, and means for controlling the contact between the fingers and conductor.

4. The combination with a series of electrically-operated keys of a musical instrument, of a non-rotating metal guide and fingers, electrically connected in the key-operating circuits, a metal bar movable endwise in the guide transversely of the fingers in electrical contact with the guide, and a perforated music-sheet for controlling the contact between the bar and fingers.

5. The combination with electrically-operated keys of a musical instrument, of a series of contact-fingers operating in connection with a music-sheet, and a bar removable endwise and having contact with the fingers, a guide for the bar, said fingers and bar being connected in the key-operating circuits.

6. The combination with a series of contact-fingers and a non-rotating sleeve of conducting material connected in circuit with a series of electrically-operated keys of a musical instrument, of a metal bar in contact with the sleeve, a music-sheet controlling the contact of the fingers with the bar, said bar being movable transversely of the movement of the music-sheet in contact with the sleeve.

7. A contact device for electrically-operated musical instruments consisting of a guide and a sliding contact bar or rod guided thereon, and a finger adapted to contact with the bar.

8. A contact device for electrically-operated musical instruments consisting of an open-sided sleeve, a sliding contact-bar guided in the sleeve and projecting through its opening, and a finger adapted to contact with said projecting portion of the bar.

9. A contact device for electrically-operated musical instruments consisting of a slidable contact-bar, and a finger having a non-corrosive sleeve rotatable on the finger and adapted to contact with the bar.

10. A contact device for electrically-operated musical instruments consisting of an open-sided sleeve, a sliding contact-bar guided in the sleeve and projecting through its opening, and a finger having a non-corrosive sleeve adapted to contact with the projecting portion of the bar.

11. A contact device for electrically-operated musical instruments consisting of a guide-rod and a sliding contact bar or rod guided thereon, and a finger having a non-corrosive sleeve adapted to contact with the bar.

12. In an automatic playing apparatus for musical instruments, an electrically-operated key, an expression-controlling device comprising a resistance-coil and contact member both connected in the key-operating circuit, one of the parts being movable upon the other, in combination with a conductor, a music-sheet adapted to make and break contact between the member and conductor, and three or more independently controlled electric circuits each having a device connected therein for shifting the movable part of the expression controlling device to a certain predetermined position.

13. In an automatic playing apparatus for musical instruments, an electrically-operated key, an expression-controlling device comprising a resistance-coil and a contact member both connected in the key-operating circuit, a conductor, a music-sheet to make and break contact between the member and conductor, and three or more electrically-operated devices controlled by the music-sheet for shifting one of the parts of the expression controlling device relatively to the other to vary the degree of resistance in the operating-circuit, each such electrically operated device being adapted to shift such part to a certain predetermined position.

14. In an automatic playing apparatus for musical instruments, an electrically-operated key, an expression-controlling device comprising a resistance-coil and a contact member both connected in the key-operating circuit, the coil being movable relatively to the contact member, a conductor, a music-sheet to make and break contact between the member and conductor, and three or more electrically-operated devices connected in independently controlled circuits for shifting the position of the coil, each of such electrically operated devices being adapted to shift the coil to a certain predetermined position.

15. In an automatic playing apparatus for musical instruments, the combination with a key, of an electric working circuit, and a key-operating magnet connected therein, contact members connected in said circuit, the contact being controlled by a music-sheet, a resistance-coil having a sliding contact with one of said members, three or more electric circuits having separate contact members adapted to engage the other of the former members and controlled by the music-sheet, and separate devices connected in the latter circuits for shifting the position of the coil, each of such devices being adapted to shift the coil to a certain predetermined position.

16. In an automatic playing apparatus for musical instruments, a key-working circuit, a contact-bar and a finger connected in said circuit, a music-sheet for controlling the contact between said bar and finger, a resistance-coil connected in said circuit, and having a sliding contact with the finger, a second electric circuit having a finger connected therein adapted to contact with the bar, said contact being controlled by the music-sheet, and an electrically-operated device connected in the second circuit and adapted to shift the coil relatively to the contact-finger to a certain predetermined position for the purpose described.

17. In an automatic playing apparatus for musical instruments, an electric key-operating circuit, a contact-bar and a finger connected in said circuit, and adapted to contact with each other, a music-sheet for controlling the said contact, a resistance-coil also connected in said circuit and having a sliding contact with the finger, three or more circuits each having a finger adapted to contact with said bar, the contact being controlled by the music-sheet, three or more independent-electrically-operated devices connected in said circuits, each of said devices being connected to shift the coil to a certain predetermined position.

18. In an automatic playing apparatus for musical instruments, an electric key-operating circuit, a contact-bar and a finger connected in said circuit and adapted to contact with each other, a music-sheet for controlling the said contact, a resistance-coil also connected in said circuit and having a sliding contact with the finger, three or more independently controlled electric circuits having electrically-operated devices separately connected therein and connections, whereby each of such devices shifts the coil to a certain predetermined position.

19. In an automatic playing apparatus for musical instruments, a plurality of key-working electric circuits, a contact-bar connected in and common to all of the circuits, a contact-finger connected in each circuit and adapted to contact with the bar, the music-sheet operating to control said contact, a resistance-coil connected in each of the circuits and having a sliding contact with its respective finger, a second series of electric circuits, an electromagnet connected in each of the latter circuits and provided with an armature, said armatures being mechanically connected to each other and each operating to shift the coils to a certain predetermined position, whereby by operation of said armatures successively the coils may be shifted step by step in opposite directions.

20. In an automatic playing apparatus for musical instruments, an electric key operating device, a circuit therefor having a contact bar and a finger connected therein, a moving stencil to control the contact for producing music, a resistance coil connected in said circuit and having a sliding contact with the finger, three or more independently controlled electric circuits, and an electrically operated device connected in each of said independently controlled circuits for shifting the position of the coil, each of such devices being adapted to shift the coil to a certain predetermined position.

21. In an automatic playing apparatus for musical instruments, an electric working circuit, a finger and a contact-bar connected in said circuit, a moving stencil to control the contact between said bar and finger, a rocking support, a resistance-coil connected in said electric circuit and mounted on the support and having a sliding contact with the finger, and a series of electrically-operated devices controlled by the stencil to shift the position of the coil, each of said electrically operated devices being adapted to shift the coil to a certain predetermined position.

22. In an automatic playing apparatus for musical instruments, an electrically-operated key, a contact-finger and a non-rotatable bar connected in the key-operating circuit, said bar being movable transversely of the finger, a resistance-coil connected in said circuit and having a sliding contact with the finger, independently controlled electric circuits having devices connected therein to shift the position of the coil and each of which is adapted to shift the coil to a certain predetermined position, and a moving stencil for controlling the contact between the finger and bar and operating to open and close the last mentioned circuits.

23. In an automatic playing apparatus for musical instruments, a key-operating electric circuit, a contact-bar and a finger connected to the circuit, a music-sheet operating to control the contact, a resistance-coil connected in the electric circuit and having a sliding contact with the finger, additional electric circuits, additional fingers connected in the latter circuits and adapted to contact with said bar, the contact being controlled by the music-sheet, and three or more electrically-operated devices connected in the additional circuits and having mechanically-connected armatures connected to move the coil, each of such devices being adapted to move the coil to a certain predetermined position.

24. In an automatic playing apparatus for musical instruments, an electric circuit having a key-operating electromagnet connected therein, contacting members connected in said circuit, a music-sheet and a trailing point coacting therewith and insulated from one of the contact members to move said member into and out of contact with the other member, a resistance-coil connected in the key-working circuit and having a sliding contact with one of the contact members, additional circuits having fingers connected therein to contact with one of said members, said latter contact being controlled by the music-sheet, and three or more electrically-operated devices connected in said circuits and each adapted to shift the resistance coil to a certain predetermined position.

25. In an automatic playing apparatus for musical instruments, a key-working circuit having a finger and a contact-bar connected therein, a music-sheet and means interposed between the music-sheet and finger and insulated therefrom whereby the contact is controlled by the music-sheet, a rocking support carrying a resistance-coil connected in the key-working circuit and having a sliding contact with the finger, additional electric circuits having fingers connected therein to contact with said bar, the contact of the latter fingers being controlled by the music-sheet, and three or more electric devices connected in the additional circuits and each adapted to shift the support to a certain predetermined position.

26. In an automatic playing apparatus for musical instruments, the combination with a plurality of key-operating electric circuits, each having a contact-finger connected therein, of a contact-bar common to all of the fingers, said bar having a sliding endwise movement transversely of the fingers whereby some of the fingers may be cut out of contact with the bar without breaking contact with the other fingers, and a music-sheet for controlling the contact of the fingers with the bar.

27. In an automatic playing apparatus for musical instruments, the combination with a key-operating electric circuit having a plurality of fingers, a guide adjustable relatively to the fingers, and a contact-bar mounted in the guide and movable transversely of the fingers, said bar being connected in the key-operating circuit, and the contact of the fingers with said bar being controlled by a music-sheet.

28. In an automatic playing apparatus for musical instruments, the combination with the swinging carriage for the music-sheet, of a detent for the carriage, means to feed the sheet in one direction, additional means to feed the sheet in the reverse direction, a second detent holding one of said means in operative position, and electrically-operated means controlled by the music-sheet to release the latter detent without releasing the carriage.

29. In an automatic playing apparatus for musical instruments, winding and rewinding rollers for the music-sheet, a swinging carriage for the rollers, driving mechanism independent of the carriage for rotating the winding-roller in one direction, and movable means normally tensioning the music-sheet and connected to shift the driving mechanism from the winding-roller to the rewinding-roller and to simultaneously release the tension on the music-sheet.

30. In an automatic playing apparatus for musical instruments, a swinging carriage for the music-sheet, winding and rewinding mechanism for the music-sheet, means to force the winding mechanism into operative position and to simultaneously tension the sheet, a detent to hold the winding mechanism in operative position, and electric means controlled by the music-sheet to release the detent.

31. In an automatic playing apparatus for musical instruments, the combination with winding and rewinding rolls for the music-sheet, an eccentrically-pivoted bridge supporting the intermediate portion of the music-sheet, an arm secured to the bridge, an electromagnet having its armature engaged with the arm to hold the bridge in its operative position, electrical contact members connected in the magnet-circuit and controlled by the music-sheet to close the circuit through the magnet and release the armature and bridge, and driving mechanism controlled by the rocking of the bridge for alternately rotating the rollers in reverse directions.

32. In an automatic playing apparatus for musical instruments, the combination with winding and rewinding rolls for the music-sheet, an eccentrically-pivoted bridge supporting the intermediate portion of the music-sheet, an arm secured to the bridge, an electromagnet having its armature engaged with the arm to hold the bridge in its operative position, electrical contact members connected in the magnet-circuit and controlled by the music-sheet to close the circuit through the magnet and release the armature and bridge, and driving mechanism controlled by the rocking of the bridge for alternately rotating the rollers in reverse directions, and manually-operated means to disengage the armature from said arm.

33. In an automatic playing apparatus for musical instruments, the combination with a winding and rewinding mechanism for the music-sheet, of manually-operated means for forcing the winding mechanism to its operative position, a detent for said means, electric means controlled by the music-sheet for operating the detent to release the former means, and additional means for automatically forcing the winding mechanism out of action and simultaneously moving the rewinding mechanism into action.

34. In an automatic playing apparatus for musical instruments, the combination with a winding and rewinding mechanism for the music-sheet, of means for automatically forcing the rewinding mechanism into operative position, a rocking member connected to force the winding mechanism into operation and to disconnect the rewinding mechanism, and electrically-operated means controlling the operation of the rocking member.

35. In an automatic playing apparatus for musical instruments, the combination with revoluble winding and rewinding rollers for the music-sheet, each roller being provided with a gear, of a rock-arm carrying driving pinions arranged to alternately engage said gears as the arm is rocked in reverse directions, an eccentrically-pivoted bridge for tensioning or releasing the tension of the music-sheet, means to rock the bridge on its pivot, and additional means controlled by the rocking of the bridge to control the rocking movement of said rock-arm whereby when the winding-roller is operated the music-sheet is tensioned and when the rewinding-roller is operated the tension is released.

36. In an automatic playing apparatus for musical instruments, the combination with revoluble winding and rewinding rollers for the music-sheet, each roller being provided with a gear, of a rock-arm having pinions adapted to alternately engage said gears to rotate the rollers in reverse directions, one of the pinions being automatically forced into engagement with the gear of the rewinding-roller, an eccentrically-pivoted bridge for supporting the intermediate portion of the music-sheet, and connected to rock the arm to engage the other pinion with the winding roller-gear, means for holding the bridge in operative position, and additional means for releasing the former means.

37. In an automatic playing apparatus for musical instruments, the combination with a feed-roller for the music-sheet, of a driving member to operate the feed-roller, a hand-lever connected to move the driving member into operative position, an armature to hold the lever in operative position, and electric means controlled by the music-sheet for operating the armature to release the lever.

38. In an automatic playing apparatus for musical instruments the combination of winding and rewinding mechanism for the music-sheet, a handpiece connected to force the winding mechanism into action, a detent for the handpiece, electric means controlled by the music-sheet for operating the detent to release the handpiece, manual means to trip the detent, independent of the electric means and automatic means for disconnecting the winding mechanism and forcing the rewinding mechanism into action when the detent is tripped.

39. In an automatic playing apparatus for musical instruments, the combination of a swinging carriage and a detent therefor, a music-sheet on the carriage, winding and rewinding mechanism for the music-sheet, a hand-lever connected to force the winding mechanism into action, a detent for said lever, the former detent being movable manually to release the carriage and provided with means to simultaneously trip the second detent to release the lever.

40. In an automatic playing apparatus for musical instruments, the combination of a swinging carriage, winding and rewinding rollers on the carriage, a music-sheet on the rollers, a driving mechanism for the rollers, a holding device for the carriage, means for moving the driving mechanism to connect with the winding-roller, a detent for said means, electric means controlled by the music-sheet for operating the detent to release the former means, automatic means for connecting the driving mechanism to the rewinding roller, a case inclosing the rewinding-roller and actuated by the music-sheet on the rewind independently of said roller, and means actuated by the case for moving the carriage-holding device to release the carriage.

41. In an automatic playing apparatus for musical instruments, the combination with a movable carriage for the music-sheet, of a series of electric circuits having key-operating electromagnets connected therein, mechanism for feeding the sheet in reverse directions, separate devices for holding the carriage and for holding said mechanism, means controlled by the music-sheet for effecting a break in the circuits and for simultaneously releasing the holding device for the feeding mechanism.

42. In an automatic playing apparatus for musical instruments, the combination with a carriage for the music-sheet, of a series of electric-circuits having key-operating magnets connected therein, circuit-closers connected in said circuits and controlled by the music-sheet, a shiftable feed for the music-sheet, separate devices for holding the carriage and feed in operative positions, a circuit-breaker connected in the key-operating circuits, and automatically-operated means controlled by the music-sheet for controlling the operation of the circuit-breaker, and also for releasing the holding device for said feed independently of the carriage-holding device.

43. In an automatic playing apparatus for musical instruments, the combination with a carriage and a reverse feed mechanism for the music-sheet, of separate devices to hold the carriage and feed mechanism in their operative positions, a plurality of electric circuits, a rheostat and a key-operating magnet connected in each of the circuits, an additional electric circuit having an electromagnet connected therein to control the operation of the movable members of said rheostat, a circuit-breaker common to all of said circuits, and electrically-operated means controlled by the music-sheet for controlling the operation of the circuit-breaker and for releasing one of the holding devices independently of the other.

44. The combination of a moving music-sheet of an automatic playing apparatus for musical instruments, an eccentrically-pivoted bridge for supporting the intermediate portion of the music-sheet, means for holding the bridge in its operative position, and electrically-operated means controlled by the music-sheet for releasing the former means.

45. In an automatic playing apparatus for musical instruments, the combination with a music-sheet and feeding-rollers for the music-sheet, of a movable carriage for the rollers, driving mechanism arranged to be connected to either of the rollers to rotate the same in reverse directions, automatic means for moving the driving mechanism to one position, manually-operated means to move the driving mechanism to the other position, additional means for holding the driving mechanism in the latter position, and electrically-operated means controlled by the music-sheet for moving said additional means to release the manually-operated means and permit the operation of the automatic means.

46. In an automatic playing apparatus for musical instruments, the combination with a roller, of a music-sheet having one end secured to the roller and its other end provided with a projection, a second roller having a flange formed with a cut-out in its periphery for receiving said projection, a spring-catch on the flange for engaging the projection and holding the music-sheet in engagement with the second roller, and means for rotating the rollers in either direction for winding and rewinding the music-sheet from one roller to the other, the music-sheet being automatically released from the second roller on the rewind.

47. In an automatic playing apparatus for musical instruments, the combination of a moving music-sheet, winding and rewinding mechanism for the music-sheet, manually operated means for forcing the winding mechanism to its operative position, a detent for said means, an electric circuit having pedal operating means connected therein, a circuit breaker connected in the pedal operating circuit and held to close the circuit by said detent, and electric means controlled by the music-sheet for moving the detent out of its operative position for the purpose described.

48. An automatic playing apparatus for musical instruments comprising a series of key-operating circuits, each having a rheostat connected therein, pedal-operating circuits, rheostat controlling circuits, contact-fingers connected in the several circuits, the coil of the rheostat having a sliding contact with its finger, a contact-bar common to all of the fingers and having a sliding contact therewith to engage all or only part of the fingers, and a moving music-sheet arranged to close the circuits through the fingers and contact-bar.

49. In a playing apparatus for musical instruments, the combination of a sliding contact bar and a finger having a contact member mounted upon and movable independently of the finger to present different faces to the contact bar.

50. In a playing apparatus for musical instruments, the combination of a non-rotating sliding contact bar and a finger having a contact sleeve rotatable thereon to present different faces to the contact bar.

51. In an electrically-operated musical instrument, a key and a key-operating electric circuit, a contact-bar and a contact-finger formed of sections, one section contacting with the bar and the other section coacting with the music-sheet to control said contact, a resistance-coil connected in the key operating circuit and having sliding contact with the former section of the finger for the purpose described.

52. The combination with a key of a musical instrument and electrically-operated means for actuating the key, of a contact bar and finger connected in the key-operating circuit, said finger being formed of sections insulated from each other, one section contacting with the bar, and the other section coöperating with the perforations of a music-sheet to control said contact and a resistance-coil having sliding contact with the former sections and connected in the key-operating circuit for the purpose set forth.

53. The combination with a key of a musical instrument and electrically-operated means for actuating the key, a contact bar and a finger connected in the key-operating circuit, said finger being formed of sections insulated from each other, one section contacting with the bar and the other section having a trailing point entering the perforations of the music-sheet for controlling the contact of the former section with the bar, and a resistance-coil connected in the same circuit with the fingers and having sliding contact therewith for the purpose specified.

54. A contact device for electrically operated musical instruments consisting of a contact-finger having a non-corrosive sleeve rotatable thereon, and a contact-member with which said sleeve is adapted to make contact.

55. In an automatic playing apparatus for musical instruments, the combination with an operating circuit, means for supporting and feeding a music sheet, and a circuit-closer in said circuit adapted to be controlled by the music sheet, of a resistance device in said circuit comprising a resistance coil and a contact-member in sliding contact with said coil and three or more sheet controlled devices each of which is adapted to cause the movable member of the resistance device to be moved to a certain predetermined position.

56. In an automatic playing apparatus for musical instruments, the combination with an operating circuit, means for supporting and feeding a music sheet, and a circuit closer in said circuit adapted to be controlled by the music sheet, of a resistance device in said circuit comprising a resistance coil and contact member in sliding contact with said coil, and three or more electrically operated sheet controlled devices each of which is adapted to cause the movable member of the resistance device to be moved to a certain predetermined position.

57. In an automatic playing apparatus for musical instruments, the combination of a series of operating circuits, means for supporting and feeding a music sheet, and a circuit closer in each of said circuits adapted to be controlled by the music sheet, of a resistance device comprising a series of resistance coils and a series of contact members in sliding contact with said coils, a coil and its contact member being in each of said circuits, and three or more sheet controlled devices each of which is adapted to cause a relative movement between the coils and the contact members of the resistance device to bring said members into a certain predetermined relative position.

58. In an automatic playing apparatus for musical instruments, the combination with a series of operating circuits, means for supporting and feeding a music sheet, and a circuit closer in each of said circuits adapted to be controlled by the music-sheet, of a resistance device comprising a series of resistance coils and a series of contact members in sliding contact with the coils, a coil and its contact member being in each of said circuits, manually operable means for moving said coils to vary the resistance of said operating circuits, a sheet-controlled member, means controlled by said member for moving said coils to vary the resistance in said operating circuits, and means for throwing said sheet-controlled member out of operation.

59. In an automatic playing apparatus for musical instruments, the combination with a series of operating circuits, means for supporting and feeding a music sheet, and a circuit closer in each of said circuits adapted to be controlled by the music sheet, of a resistance device comprising a series of resistance coils and a series of contact members in sliding contact with the coils, a coil and its contact member being in each of said circuits, manually operable means for causing a relative movement between the resistance-coils and the contact members of the resistance device for varying the resistance of said operating circuits, means controlled by the music sheet for causing a relative movement between the resistance coils and the contact members for automatically varying the resistance of said operating circuits, and means for putting the last mentioned means out of operation without affecting the operation of the circuit closures of the operating circuits.

60. In an automatic playing apparatus for musical instruments, the combination with an operating circuit, means for supporting and feeding a music sheet, and a circuit closer in said circuit adapted to be controlled by the music sheet, of a resistance device in said circuit, manually operable means for varying the resistance of said resistance device, electrically operated means controlled by the music sheet for automatically varying the resistance of said resistance device, and means for preventing the operation of said electrically operated means without affecting the operation of the circuit closure of said operating circuit.

61. In an automatic playing apparatus for musical instruments, the combination with a series of operating circuits, means for supporting and feeding a music sheet, and a series of trailers adapted to co-act with the music sheet for closing said operating circuits, of a resistance device including a member movable for varying the resistance in said operating circuits, manually operable means for moving the movable member of the resistance device, electro-magnets for operating said member, additional circuits to said magnets, trailers for co-acting with the music sheet for closing the circuits to said magnets, and means for preventing the closing of the magnet circuits by their trailers without affecting the operation of said series of trailers for closing the operating circuits.

62. In an automatic playing apparatus for musical instruments, the combination with a series of operating circuits, means for supporting and feeding a music sheet, a series of trailers adapted to co-act with the music sheet for closing said operating circuits, of a resistance device including a member movable for varying the resistance of said operating circuits, manually operable means for moving the movable member of the resistance device, electromagnets for operating said member, circuits to said magnets, trailers for co-acting with the music sheet for closing the circuits to said magnets, and means for preventing the energizing of said magnets through the operation of said trailers without affecting the energizing of the operating circuits by the action of their trailers.

63. In an automatic playing apparatus for musical instruments, the combination with a series of operating circuits, means for supporting and feeding a music sheet, and a series of trailers adapted to co-act with the music sheet for closing said operating circuits, of a resistance device including a member movable for varying the resistance in said operating circuits, manually operable means for moving the movable member of the resistance device, electro-magnets for operating said member, additional circuits to said magnets, trailers for co-acting with the music sheet for closing the circuits to said magnets, and means for raising said last mentioned trailers away from the music sheet.

64. In an automatic playing apparatus for musical instruments, the combination with an electric key-operating device, an operating circuit therefor, means for supporting and feeding a music sheet, and a circuit closer in said circuit adapted to be controlled by the music sheet, of a resistance device in said circuit comprising a resistance coil and a contact member in sliding contact with said coil, a rocking support on which one of said members of the resistance device is mounted, and means controlled by the music sheet for rocking said support to vary the resistance in said operating circuit, said means comprising three or more electrically operated devices each of which is adapted to shift the support to a certain predetermined position.

65. In an automatic playing apparatus for musical instruments, the combination with a series of operating circuits, means for supporting and feeding a music-sheet, and a circuit closer in each of said circuits adapted to be controlled by the music sheet, of a resistance device comprising two parts, namely a series of resistance coils and a series of contact members in sliding contact with the coils, a coil and its contact member being in each of said circuits, a rocking support on which one of said parts of the resistance device is mounted, and means controlled by the music sheet for rocking said support to vary the resistance in said operating circuits, said means comprising three or more devices each of which is adapted to shift the support to a certain predetermined position.

66. In an automatic playing apparatus for musical instruments, the combination with a series of operating circuits, means for supporting and feeding a music sheet, and a circuit closer in each of said circuits adapted to be controlled by the music sheet, of a resistance device comprising two parts, namely a series of resistance coils and a series of contact members in sliding contact with the coils, a coil and its contact member being in each of said circuits, a rocking support on which one of said parts of the resistance device is mounted, manually operable means for rocking said support to vary the resistance in said operating circuits, means controlled by the music sheet for causing said support to be rocked for automatically varying the resistance in said operating circuits, and means for preventing the rocking of the support by said last mentioned means.

In witness whereof we have signed our names to this specification in the presence of two subscribing witnesses.

TIMOTHY BERNARD POWERS.
MAJOR ROMEYN JEWELL.

Witnesses for Powers:
T. F. Kehoe,
G. M. Borst.

Witnesses for Jewell:
Eva L. Jewell,
William H. DeBusk.